(12) United States Patent
Nielsen

(10) Patent No.: US 7,754,073 B2
(45) Date of Patent: Jul. 13, 2010

(54) METHOD AND APPARATUS FOR COLLECTING AND/OR REMOVING SLUDGE

(75) Inventor: Ian Bradley Nielsen, Kingscliff (AU)

(73) Assignee: Ultra Aquatic Technology Pty Ltd, Kingscliffe, New South Wales (AU)

( * ) Notice: Subject to any disclaimer, the term of this patent is extended or adjusted under 35 U.S.C. 154(b) by 89 days.

(21) Appl. No.: 12/094,552

(22) PCT Filed: Nov. 22, 2005

(86) PCT No.: PCT/AU2006/001749

§ 371 (c)(1),
(2), (4) Date: May 21, 2008

(87) PCT Pub. No.: WO2007/059562

PCT Pub. Date: May 31, 2007

(65) Prior Publication Data

US 2009/0026131 A1    Jan. 29, 2009

(30) Foreign Application Priority Data

Nov. 22, 2005  (AU) .............................. 2005906471

(51) Int. Cl.
*B01D 21/18* (2006.01)
(52) U.S. Cl. .............................. 210/170.04; 210/170.05; 210/242.1; 210/527; 37/320
(58) Field of Classification Search .................. 210/747, 210/803, 170.04, 170.05, 170.09, 170.11, 210/242.1, 523, 527; 15/1.7; 31/317, 318, 31/320; 37/317, 318, 320
See application file for complete search history.

(56) References Cited

U.S. PATENT DOCUMENTS

| 1,964,951 | A | * | 7/1934 | Kertzman | 37/318 |
| 2,141,811 | A | * | 12/1938 | Everson | 15/1.7 |
| 2,204,584 | A | * | 6/1940 | Flower | 37/318 |
| 2,646,889 | A | * | 7/1953 | Dulak | 15/1.7 |
| 3,738,029 | A | * | 6/1973 | Harmon | 37/318 |
| 3,796,658 | A | * | 3/1974 | Meissner | 210/242.1 |
| 3,797,664 | A | | 3/1974 | Pentz | |
| 4,647,374 | A | * | 3/1987 | Ziaylek et al. | 210/242.1 |
| 4,776,112 | A | * | 10/1988 | Urbani | 210/242.1 |
| 4,819,346 | A | * | 4/1989 | Maitlen | 37/318 |
| 4,911,831 | A | * | 3/1990 | Davison et al. | 37/318 |
| 4,957,622 | A | * | 9/1990 | Mims | 210/170.04 |
| 5,198,125 | A | | 3/1993 | Coudriet | |
| 5,340,485 | A | | 8/1994 | Bradley | |
| 6,584,709 | B2 | * | 7/2003 | Martel et al. | 210/170.04 |
| 2005/0211637 | A1 | * | 9/2005 | Sower | 210/803 |

FOREIGN PATENT DOCUMENTS

| WO | 2004/094032 | 11/2004 |
| WO | 2005/028069 | 3/2005 |

* cited by examiner

*Primary Examiner*—Christopher Upton
(74) *Attorney, Agent, or Firm*—Shoemaker and Mattare

(57) ABSTRACT

Apparatus for removing solids such as sludge from a liquid reservoir comprising a float, a suction head assembly carrying a pump, and elongated guides interconnecting the suction head assembly and float. The float also carries a winch for raising and lowering the suction head assembly. The guides are slidably engaged with the float and serve to indicate the depth of operation of the suction head assembly.

20 Claims, 7 Drawing Sheets

METHOD AND APPARATUS FOR COLLECTING AND/OR REMOVING SLUDGE

TECHNICAL FIELD

This invention relates to a method and apparatus for collecting and/or removing sludge or other solids settling or suspended in liquid in a liquid reservoir and in particular but not exclusively to a method an apparatus for collecting and/or removing sludge from shallow ponds such as effluent ponds.

BACKGROUND ART

In many situations it is either desirable or necessary to remove sludge and other solids settling in or suspending in liquid in a liquid reservoir. For example, in settling ponds such as settling ponds used in piggeries, dairies, poultry farms and animal feed lots, in sewerage settling ponds, in mining slurry ponds or other ponds, there tends to be an increase in solid matter over a period of time in the pond water. As a result of build up of this solid matter, it is often necessary to empty the pond at regular intervals. This creates an environmental problem in liquid disposal. Further after a pond is drained, heavy machinery is usually required to be used at considerable cost to remove and spread the solid matter which has settled as sludge on the base of the pond. The pond is then required to be refilled necessitating use of a large quantity of water. It would be desirable therefore to be able to efficiently remove sludge or other solid materials from ponds without emptying the pond.

SUMMARY OF THE INVENTION

The present invention aims to provide a method and apparatus for collecting and/or removing sludge or other solids settling in or suspending in liquid in a liquid reservoir. Other objects and advantages of the invention will become apparent from the following description.

Reference to "solids" in description and claims includes solids or other materials which are entrained or suspended in or settle in liquids in a liquid reservoir including sludge.

The present invention thus provides in one preferred aspect apparatus for removing materials settling in or suspending in liquid in a liquid reservoir, said apparatus comprising a float assembly, a suction head assembly, said suction head assembly including a hollow elongated suction head having an open lower side defining an entrance mouth, a suction pump mounted to said suction head assembly and adapted to communicate with said suction head, said pump being operable to create a suction pressure in said suction head to draw in materials through said mouth and pump said materials to a remote location, guide means between said suction head assembly and said float assembly for guiding movement of said suction head assembly relative to said float assembly and means for raising and lowering said suction head assembly relative to said float assembly.

Preferably the pump has an outlet to which an outlet duct, hose or the like may be connected whereby sludge or other materials or liquid may be pumped to a remote location such as a location on or adjacent a bank of the liquid reservoir.

Means may be provided for agitating the liquid/sludge in which the pump is operating to facilitate collection of liquid/sludge by the pump. The agitating means may comprise one or more electric motor operated agitators or mixers.

The pump suitably is an electric motor operated pump with power for the pump motor being provided by an electrical cable connected to a remote power source. The pump may comprise a centrifugal pump.

Preferably the means for suspending the suction head assembly from the float means comprises a winch which is operable to selectively raise or lower the suction head assembly, the winch being mounted to or on the float assembly and having a winch cable coupled to the suction head assembly. Preferably the winch is an electric motor driven winch and an electrical power source such as a battery is supported on or by the float for supplying current to the winch. Preferably remote operable means such as a remote wireless control means may be provided for remotely controlling the supply of current from the battery to the winch motor. A manually operated winch may also be connected to the suction head assembly to enable manual raising or lowering of the suction head assembly as required.

The suction head suitably comprises a hollow body which has an open lower side defining the mouth. The upper side of the body is suitably provided with an outlet for connection to the inlet of the pump. Preferably, the pump is mounted for movement relative to the suction head between a position where the pump inlet is adjacent to the suction head outlet and communicates therewith and a position where the pump inlet is moved clear of the suction head outlet so as to permit for example clearing of blockages from the pump inlet. Preferably the pump is mounted for pivotal movement between its respective positions. Preferably the suction head assembly includes a support frame and the pump is mounted on a pivot frame pivotally mounted to the support frame whereby the pump may be pivoted between its respective positions. Preferably means are provided to lock or secure the pump in its position in cooperation with the suction head. Preferably sealing means are provided to seal the pump inlet to the suction head outlet. The sealing means may comprise a planar sealing member.

The hollow body of the suction head may be of elongated domed form or cross section. Means may be provided for introducing a liquid into the suction head to agitate the settling solids to facilitate their collection by the suction head. Such means may include one or more inlets to the suction head. The one or more inlets are suitably connectable to a source of pressurised fluid typically water or other liquid such as liquid in the liquid reservoir. The one or more inlets suitably comprise one or more inlet spigots on the suction head.

The suction head is suitably supported for movement over the bottom of the liquid reservoir. The suction head assembly suitably includes supports which suitably support the suction head in a substantially horizontal attitude. The supports may comprise skids provided at opposite ends of the suction head assembly.

The or both sides of the support frame may be provided with blade-like frame members for penetrating sludge in which the suction head assembly is operating. Flexible skirts may be provided on each side of the support frame to increase the suction effect on the suction head. Alternatively means may be provided for agitating or displacing the sludge to facilitate its collection. Such means may comprise a plurality of short lengths of chains at the opposite sides of the suction head assembly.

To prevent larger materials from entering the pump inlet, a screen or mesh material may be provided over the suction head mouth. Alternatively a screen or mesh material may be associated with the pump inlet.

In another form, the suction head is replaced by a solids screen to prevent large solids being pumped by the pump from the pond. The solids screen may be of the same configuration as the suction head and suitably formed of a mesh-like material.

The float assembly suitably includes one or more buoyancy members or floats which are adapted to be supported one above the other. The or each buoyancy member may define a hollow chamber which may be sealed to define one or more air reservoirs. The buoyancy members may be of annular form. Alternatively or additionally a plurality of buoyant bodies such as foam plastics bodies may be located in the hollow chamber. The hollow chamber may be circular or rectangular in cross section and the buoyant bodies may be tubular bodies for neat receipt in the hollow chamber. In a further alternative arrangement, a buoyant foam plastics material may be injected into the hollow chamber. The buoyancy member however may comprise any form of buoyant body or bodies.

The float assembly suitably is supported on skids whereby the float assembly may be supported for movement on or over a surface such as the bank of a reservoir or pond. The float assembly may include a frame and the buoyancy members are mounted on or to the frame. The frame may be provided with the skids. Preferably the skids of the suction head assembly are located inwardly of the skids of the frame of the float assembly whereby they may be located therebetween in an in operative or retracted attitude of the suction head assembly.

The apparatus suitably includes means for indicating the depth of operation of the suction head assembly in a said liquid reservoir. The depth indicating means suitably comprise the guide means.

Preferably the guide means comprise one or more elongated members. The one or more elongated members may be disposed in an upright attitude such as to indicate the depth of the suction head assembly. The one or more elongated members suitably are connected to the suction head assembly and is/are guided relative to the float members so as to provide a visual indication of the depth of operation of the suction head assembly. Preferably the float members include one or more guides or slide members through which the one or more elongated guide members pass to be captured and guided. Preferably the guide means includes a pair of elongated members, the elongated members being provided at opposite ends of the suction head assembly and extending through opposite guides or slides provided on the float assembly. In a preferred form, the elongated members are pivotally connected to opposite ends of the suction head assembly. Preferably the guide means prevent or substantially limit twisting of the suction head assembly relative to the float assembly. Preferably the guide means guide the suction head assembly for substantially vertical movement beneath the float assembly such that the apparatus has a relatively small footprint.

In another arrangement the guide means may comprise guide members or arms pivotally connected at opposite ends to the float assembly and suction head assembly.

Any suitable means may be provided for moving the apparatus in the liquid reservoir in which it is operating. Such means may comprise a winching system comprising a winch having a cable coupled to the apparatus to move the float assembly and pump and/or suction head assembly in the liquid reservoir. Alternatively, the cable of the winch can be attached to the suction head assembly. Means may be provided for automatically reversing the winch for example where the apparatus is approaching a bank of the liquid reservoir. The reversing means may cause the apparatus to traverse back and forwards over the liquid reservoir. The automatic reversing means may include means associated with the coupling cable. The automatic reversing means may include one or more limit switches which may be actuated by one or more stop means on the cable. The stop means may comprise floats which serve to support the cable at or adjacent the surface of liquid in the reservoir.

BRIEF DESCRIPTION OF THE DRAWINGS

In order that the invention may be more readily understood and put into practical effect, reference will now be made to the accompanying drawings which illustrate preferred embodiments of the invention and wherein:—

DETAILED DESCRIPTION OF THE PREFERRED EMBODIMENT

Figure 1:
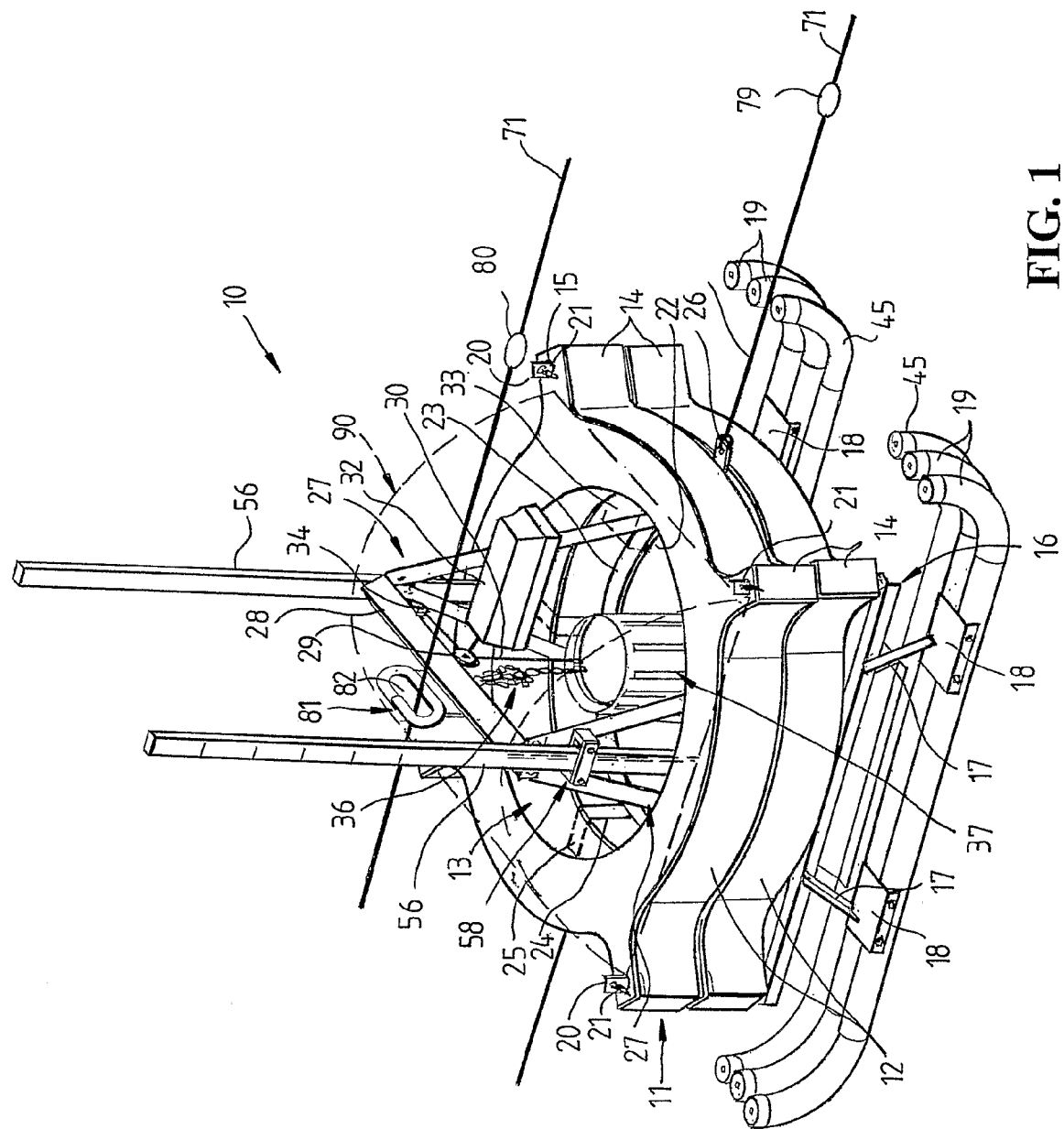
FIG. 1 is a perspective view of a sludge harvester according to first aspect of the invention.

Referring firstly to FIG. 1, there is illustrated a sludge harvester 10 according to an embodiment of the invention for removing sludge or other material settling on or adjacent the floor of a liquid reservoir such as an effluent pond or other settling pond or for removing materials suspended in liquid in a pond. The sludge harvester 10 includes a float assembly 11 which includes in this embodiment a pair of annular hollow float members 12 having a central hollow interior or opening 13, each float member 12 serving as an air reservoir and for this purpose being sealed to contain air and act as a float. Alternatively, one or more buoyant bodies such as foam plastics members or inserts such as members or inserts of tubular configuration may be located in the hollow float member 12. In an alternative arrangement, a buoyant foam plastics material may be injected into a hollow float member 12. Each hollow float member 12 is provided with circumferentially spaced radially extending lugs 14 having apertures 15 therein. The float members 12 are typically formed of plastics materials with the lugs 14 formed integrally.

The float members 12 are mounted to a frame assembly 16 which includes downwardly depending legs 17 mounted via brackets 18 to two pairs of spaced apart elongated skids 19, the skids 19 being curved upwardly at their opposite ends. The skids typically are tubular members formed of plastics. The frame assembly 16 additionally includes upstanding corner posts 20 which extend through aligned apertures 15 in the lugs 14 or the float members 12 such that the float members 12 are supported in a piggy-back manner. Pins 21 passed through apertures in the upper ends of the posts 20 prevent detachment of the float members 12 from the posts 20.

At least the lower float member 12 has an inner annular support flange 22 on which an annular frame member 23 seats. Upstanding support brackets 24 are fixed to the frame member 23 at spaced circumferential locations, each bracket 24 having an outwardly directed flange 25 which extends between the upper and lower float members 12 to provide additional support to the annular frame member 23. The flanges 25 of the centrally located front and rear members 24 define lugs 26 which extend to the front and rear of the float members 12 for a purpose which will hereinafter become apparent.

Opposite A-frames 27 are secured at their lower ends to the frame member 23 on opposite sides thereof and a cross arm 28 extends between the frames 27. A pulley 29 is secured centrally to the cross arm 28 and guides a cable 30 connected between a suction head assembly 31 (see FIG. 2) and electric winch 32 mounted to a frame 27. One of the frames 27 also carries a battery 33 (shown in dotted outline) for supplying current to the winch 32. One frame 27 also supports a manual winch 33 also having a cable 35 connected to the suction head assembly 31. A chain 36 is also connected between the cross arm 28 and suction head assembly 31 which allows full movement of the suction head assembly 31 relative to the arm 28 but maintains the suction head assembly 31 securely connected to the arm 28.

Figure 2:
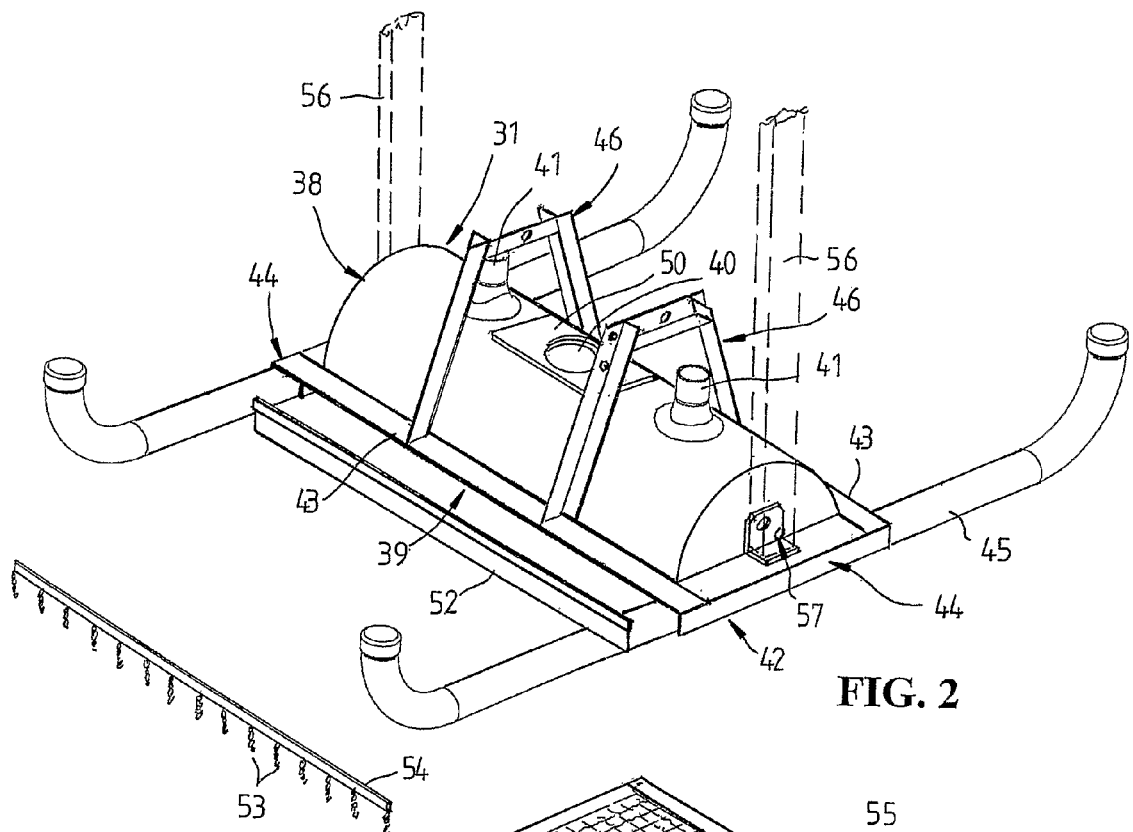
FIG. 2 is a perspective view of the suction head assembly for use with the harvester.
Figure 3:
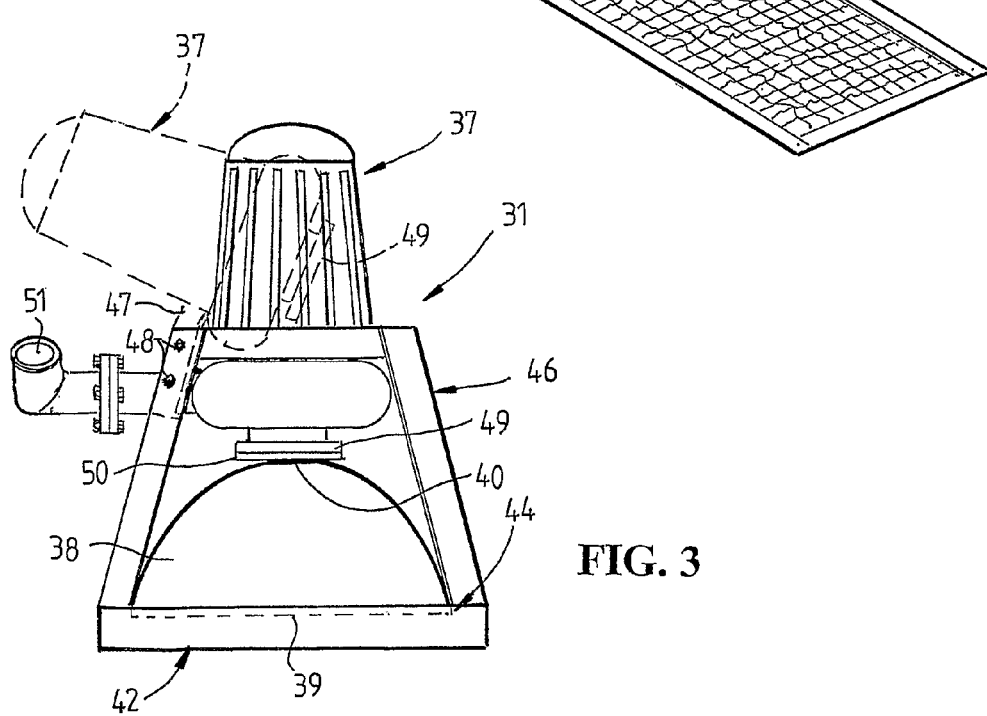
FIG. 3 is a side view of the suction head assembly.

The suction head assembly 31 as shown more clearly in FIGS. 2 and 3 includes a liquid pump 37 mounted on a hollow elongated domed suction head 38 which has an open mouth 39 on its lower side and which on its upper side is provided with a central outlet 40 and a pair of normally sealed inlet spigots 41 which communicate with the interior of the suction head 38.

The suction head 38 is mounted on a rectangular support frame 42 having forward and leading blade-like flanges 43. The frame 42 has channel members 44 at opposite ends which may seat on and be secured to further skid arms 45 which are similar to the skid arms 19 of the float assembly 11 being of tubular form and curved upwardly at their opposite ends and which support the suction head 38 for movement over a pond or reservoir floor.

A pair of further A-frames 46 are mounted between the forward and leading flanges 43 and support a pivot frame 47 to which the pump 37 is mounted by bolting, the pivot frame 47 being bolted by bolts 48 to the respective frames 45.

When the pivot frame 47 is fixed non-rotatably to the A-frames 46 as in FIG. 3, the pump inlet 49 is aligned with and communicates with the suction head outlet 40. To ensure an effective seal between the inlet 49 and outlet 40, a flap-like seal member 50 is provided on the upper side of the suction head 38 around the outlet 40. Thus when the pump 37 is in the full-line position of FIG. 3, the seal member 50 is sandwiched between the inlet 49 and outlet 40. In the event for example of any blockages however, one of the bolts 48 may be disconnected which permits the pivot frame 47 to be pivoted to the dotted outline position of FIG. 3 which provides access to the pump inlet 49 and suction head outlet 40. The pump 37 is powered by an electrical power supply via an electrical cable (not shown). The pump 37 has an outlet 51 for connection to a pump outlet line through which sludge is conveyed to a shore line or bank adjacent the liquid reservoir. The pivot frame 47 to which the pump 31 is secured enables the mounting of any other type or size of pump in place of the pump 31

To increase the suction effect of the suction head 38, elongated flexible skirts 52 may be secured to the flanges 43 to extend downwardly therefrom, the skirts 52 typically being formed of rubber or other flexible strip-like material (see FIG. 2).

In another arrangement in place of the skirts 52 and to agitate or disturb the sludge in which the suction head assembly 31 is operating, a series of short chains 53 (see also FIG. 2) may be secured to the or both flanges 43, the chains 53 being mounted to an elongated member 54 fixed to a flange 43. Of course other arrangements may be provided for agitating the sludge.

To prevent larger solid materials entering the suction head 38, a screen 55 shown in FIGS. 2 and 3 may be secured over the mouth 39 of the head 38, the screen 55 typically being formed of a wire mesh material.

To provide a visual guide to the depth of operation of the suction head assembly 37 and also guide movement of the suction head assembly 31 relative to the float assembly 11, an upright elongated guide member 56 is connected at its lower end to one end of the frame 42 of the suction head assembly 37 by a pivot connection 57 (see FIG. 2). The elongated guide member 56 passes at its opposite end through a slide assembly 58 mounted to a frame 27. The slide assembly 58 captures the guide member 56 to the frame 27 and may include bearings such as a low-friction pad to allow for smooth sliding movement of the guide member 56 relative to the frame 27. In a preferred form, a pair of spaced apart upright guide members 56 are pivotally connected to opposite ends of the suction head assembly 31 as indicated in dotted outline in FIG. 2 and pass through respective slides 58 mounted to opposite frames 27. Thus a pair of substantially parallel guide members 56 interconnect the suction head assembly 31 and float assembly 11. This not only provides for vertical guided movement of the suction head assembly 31 relative to the float assembly 11 but also prevents twisting of the suction head assembly 31 relative to the float assembly 11.

Furthermore, the or each guide member 56 provides a visual indication of the operating depth of the suction head assembly 31. Thus as the suction head assembly 31 is raised or lowered by operation of the winch 32, the guide member or members 56 will simultaneously rise and lower and guide the suction head assembly 31 substantially vertically towards and away from the float assembly 11 and the extent that the guide member or members 56 is visable above the float assembly 11 indicates the operating depth of the suction head assembly 31. The or each guide member 56 may have markings thereon to indicate depth of operation of the suction head assembly 31.

Figure 4:
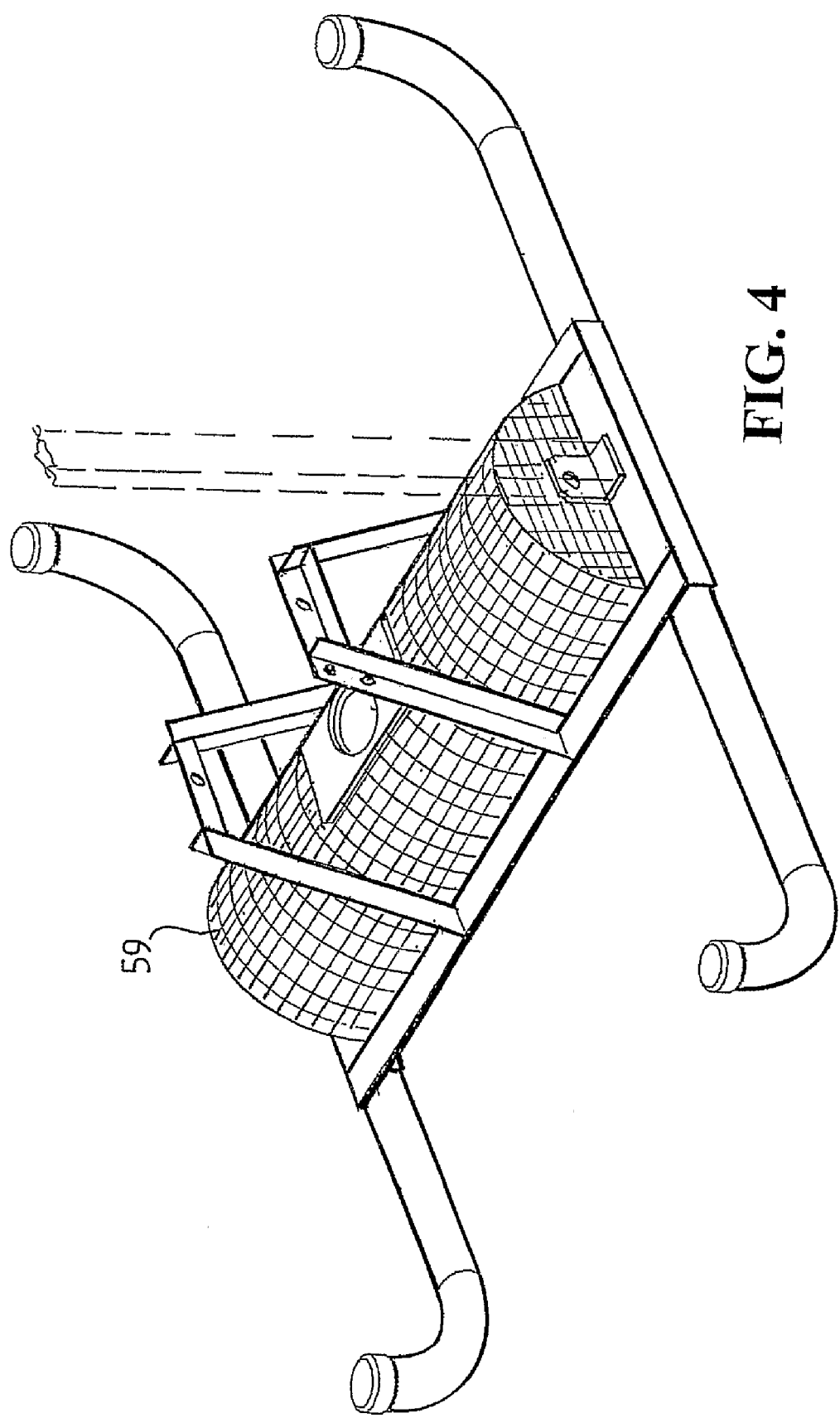
FIG. 4 is a perspective view of an alternative suction head for use in the sludge harvester.

Whilst the suction head 38 is usually formed of an impervious material for example formed or moulded from plastics or fibreglass, the head 38 may be replaced by a head formed of a mesh material 59 as shown in FIG. 4 which also is provided over the mouth 39 of the head 39 and which defines an enclosed hollow mesh housing which acts as a screen to prevent larger solids entering the pump 31. The mesh material 59 typically comprises wire mesh.

Figure 5:
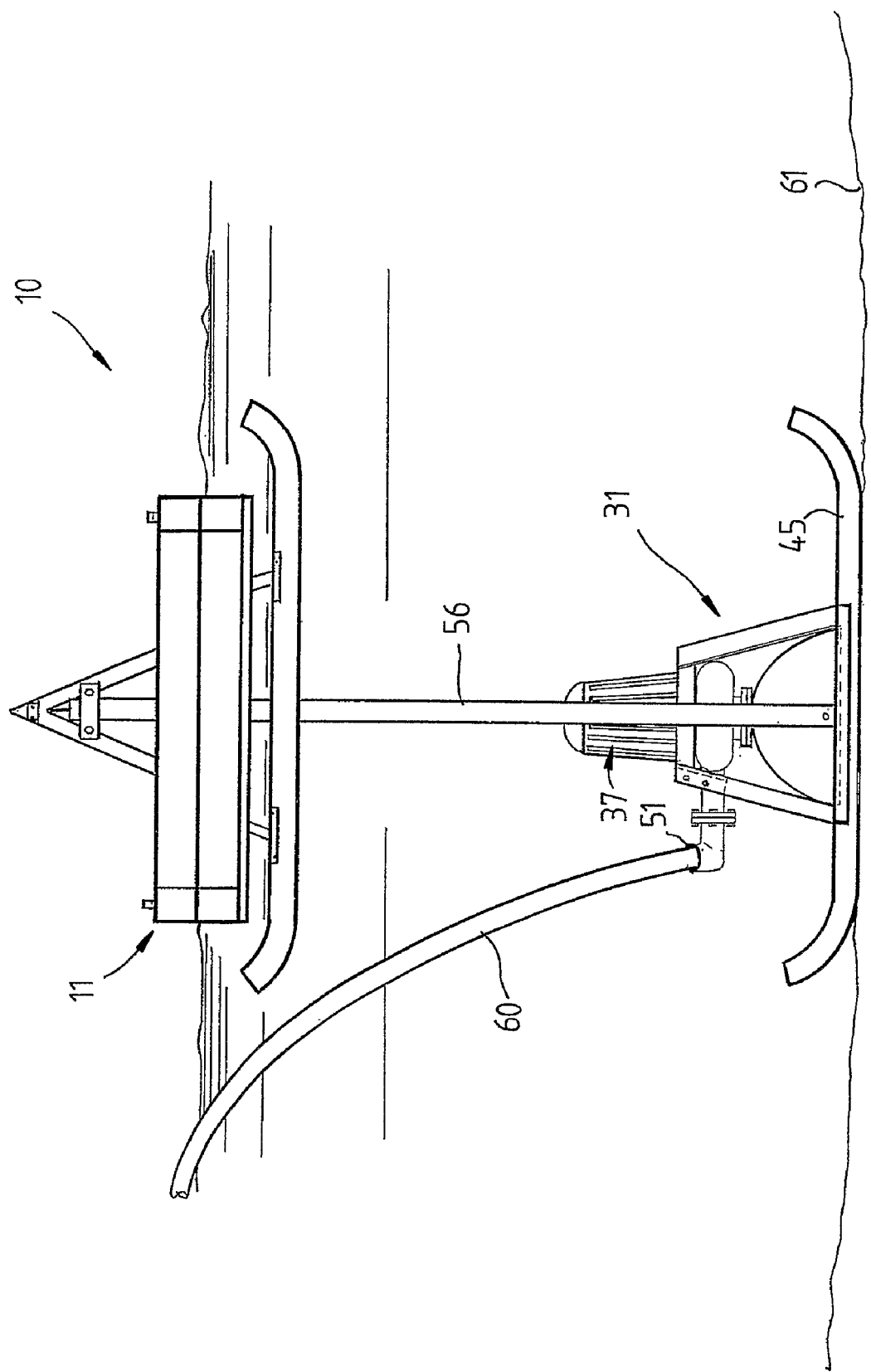
FIG. 5 illustrates the sludge harvester with the suction head assembly lowered to the floor of a settling or effluent pond.

In use, the apparatus 10 with the suction head assembly 31 retracted as in FIG. 1 is floated onto a body of water or liquid in a reservoir or pond from which sludge or the like is to be removed with a flexible discharge hose 60 connected to the pump outlet 51. The apparatus 10 is then moved to a position in the reservoir where sludge or other solids are to be removed and the winch 32 is then operated to lower the suction head assembly 31 onto the submerged bed 61 of the reservoir where it is supported by the skids 45 as shown in FIG. 5. The suction head assembly 31 however need not be lowered down to the bed 61 but may simply be lowered to an intermediate position and the depth of operation of the suction head assembly 31 will be indicated by the extent that the elongated guide members 56 are visible above the float assembly 11. The pump 37 is then operated by supply of current to its electric motor by power cables (not shown) which extend to a power supply on the bank of the reservoir. The suction created in the suction head 38 will draw in sludge and other materials into the suction head 38 and the collected materials will be pumped through the pump outlet 51 into the discharge hose 60 where it may be connected to any discharge point. Typically the discharge hose 60 is supported by spaced floats along the hose 60. The winch 32 may be operated by a remote control such as a wireless remote control.

Figure 6:
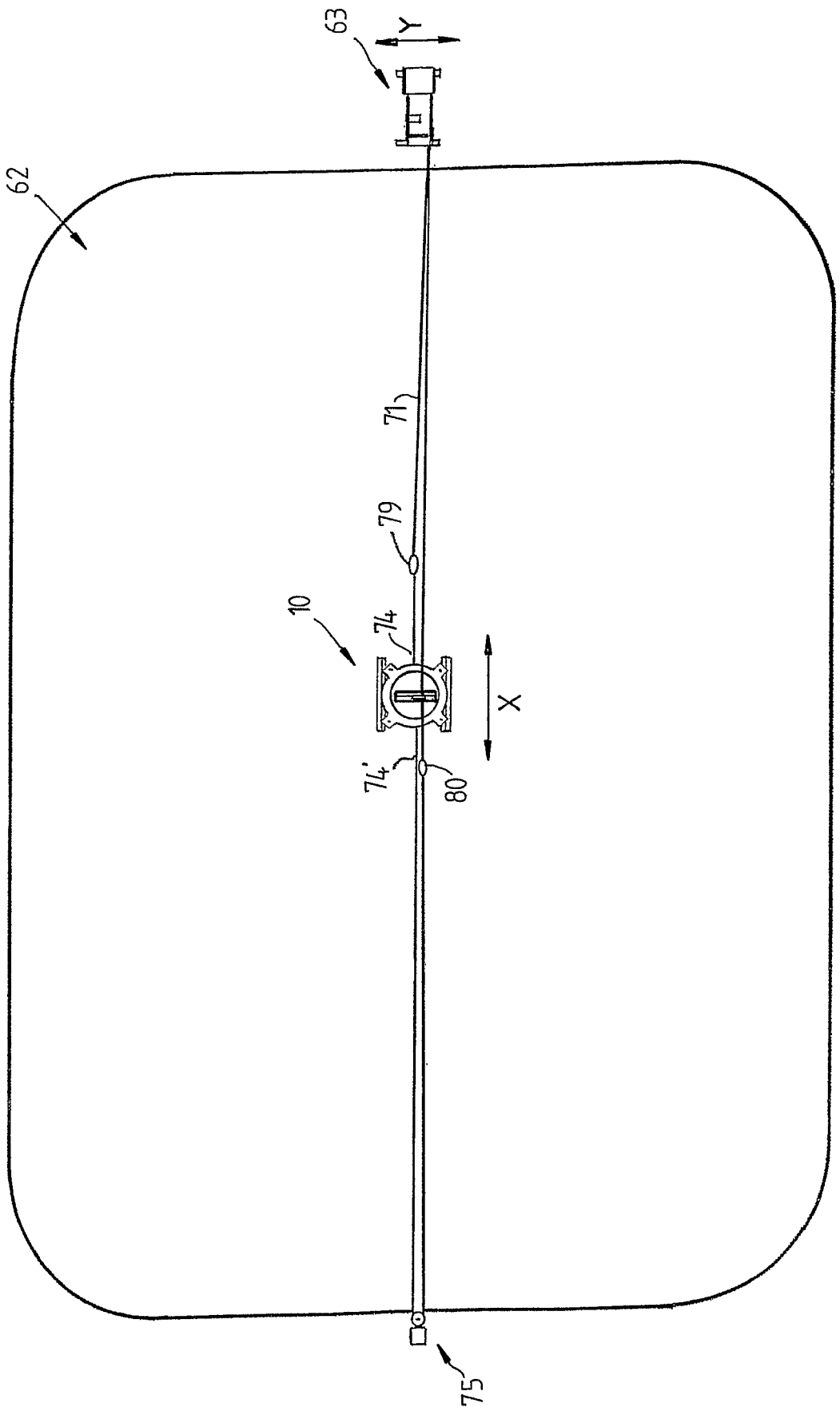
FIG. 6 illustrates the system for using the sludge harvester in a settling or effluent pond.
Figure 7:
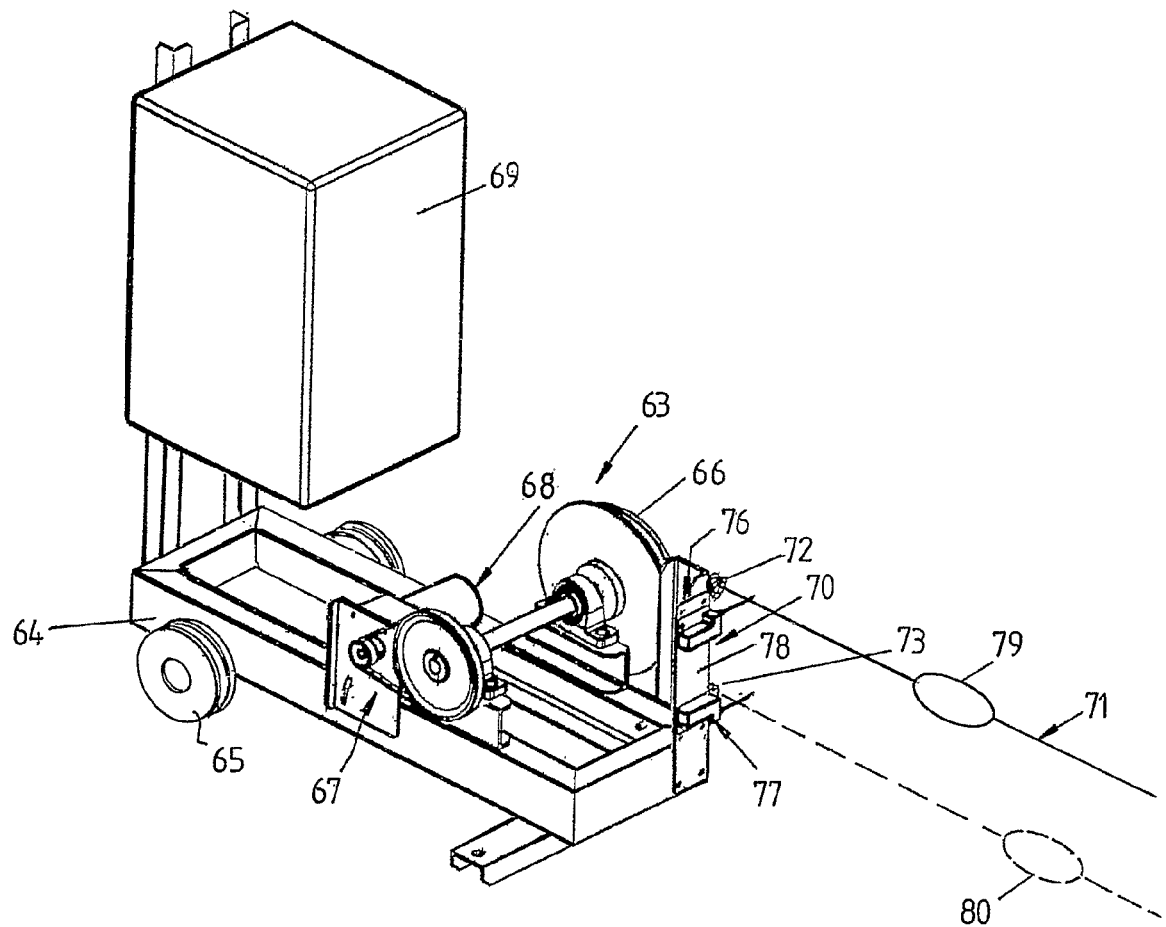
FIG. 7 illustrates a winch assembly for used in the system of FIG. 6.

The sludge harvester 10 is most suitably used by being moved around the body of liquid in which it is operating. A typical arrangement for operating the sludge harvester 10 in a settling pond 62 is illustrated in FIG. 6. In this arrangement, a winch 63 (shown in FIG. 7) is provided on one bank of the pond 62 either fixedly mounted or mounted for movement along the bank. The winch 63 is mounted on a chassis 64 which may be provided with a pair of supporting wheels 65 and includes a winch wheel 66 connected through a gear and sprocket (or a belt and pulley) transmission 67 to an electric drive motor 68. A switch box 69 is provided on the chassis 64 for controlling supply of current to the electric drive motor 68 of the winch 63.

Current is supplied to the drive motor 68 of the winch 63 through a direction switch assembly 70 which controls the direction of supply of current to the motor 68 and thus the direction of operation of the winch 63. A cable 71 passes around the winch wheel 66 and through upper and lower guides 72 and 73 and has one end 74 coupled to one lug 26. The other end 74' of the cable 71 passes around a pulley block 75 on the opposite side of the pond 62 and is connected back to a lug 26 on the opposite side of the sludge harvester 10.

The direction switch assembly 70 includes a pair of spaced apart limit switches 76 and 77 which are mounted via a support bracket 78 on the chassis 64, the support bracket 78 also carrying the guides 72 and 73. The cable 71 carries a pair of floats or stops 79 and 80 which can engage the limit switches 76 and 77 to reverse the direction of rotation of the winch wheel 66 for example by reversing the direction of operation of the motor 68. The floats or stops 79 and 80 may be adjusted along the cable 71 to vary the position of reversing movement of the sludge harvester 10.

To guide the cable 71 and a float or stop 79 or 80 past the harvester 10 without fouling on the harvester 10, a guide 81 (see FIG. 1) is provided on the cross arm 28, the guide 81 comprising a split elongated link-like member which defines an opening 82 through which the cable 71 and floats 79 or 80 may pass. The guide 81 is split on its upper side to allow insertion of the cable 71 with the split ends of the guide 81 being offset such that the cable 71 will be captured within the guide 81.

In use when the winch 63 is operated, the sludge harvester 10 with the suction head assembly 31 lowered as shown in FIG. 5 is moved across the pond 62 causing the suction head assembly 31 to move along the floor of the pond 62. In this movement the flanges 39 act as knives to penetrate the sludge. Current supplied to the pump 37 causes sludge to be drawn into the suction head 38 and pumped through the pump outlet 51 and discharge hose 60. As the sludge harvester 10 approaches one end of the pond 62, one stop or float for example the stop or float 79 will contact the limit switch 76 to reverse the direction of operation of the winch 63 and thus the direction of movement of the harvester 10. When the harvester 10 approaches the opposite end of the pond 62 and thus the pulley 75, the other stop or float 80 is positioned on the cable 71 to contact the other limit switch 77 to again reverse the direction of operation of the winch 63. The suction head assembly 31 may thus traverse over the bottom of the pond 62 in opposite directions indicated by the arrow X in FIG. 5.

The winch 63 may be moved along the bank in the opposite directions Y and the pulley block 75 on the opposite bank is additionally or alternatively moved to allow other areas of the pond floor to be dredged.

Where the apparatus 10 is to be removed from the pond 62, the suction head assembly 31 is raised by operation of the winch 32 and when pulled to the edge of the pond 62 by operation of the winch 63, the float assembly 11 and suction head assembly 31 will be supported on the respective skids 19 and 45 for movement onto the bank of the pond 62.

To increase the collection of sludge, the suction head 38 may be provided with the flaps 52 or chains 53. Alternatively, the spigots 41 which are normally sealed may be connected to a pressurised water or other liquid supply so that sludge is displaced beneath the head 38 by the entering liquid.

In a simplified form, the suction head assembly 31 may be removed and sludge simply pumped directly by the pump 37 from the reservoir 62. In this case the float assembly 11 floats on or adjacent the surface of water or liquid in the reservoir and the height of the pump 37 is adjusted to any required depth in the reservoir. The outlet from the pump 31 is typically connected via the hose 60 to the bank of the pond or reservoir 62 where sludge is collected for drying or other purposes. The pump 37 may be operated in this arrangement with the mesh screen or filter head of FIG. 6.

Submergible agitators or mixers may be mounted on a frame 46 or frames 47 or at any other position on the suction head assembly 31 to agitate the sludge to facilitate sludge collection by the pump 37.

The apparatus 10 described above may be used in many different applications where solids, sludge or other materials are/is required to be collected from a liquid reservoir such as in mining, chemical treatment, manufacturing, or abattoir effluent ponds, agricultural applications such as piggeries, dairies, poultry farms and animal feed lots as well as from recreational ponds or lakes at golf course, council parks, and residential canal developments.

The buoyancy members of the float assemblies may be replaced by separate floatation elements such as foam blocks or alternatively, the suction head assembly 31 may be supported on floating rafts or other buoyant body.

The dual floats members 12 may be replaced by a single float member which may be enlarged or additionally float members 12 provided. The dual skids 19 may also be replaced by single skids.

If any difficulties are encountered in retrieving the pump 37 (with or without attached suction head assembly 31), the hand winch 34 may be used. Alternatively, the chain 36 which is connected to the pump 37 may be used to elevate the pump 37 (with or without attached suction head assembly 31) from the liquid body in which the harvester 10 is operating for example with the use of a crane or the like.

Figure 8:
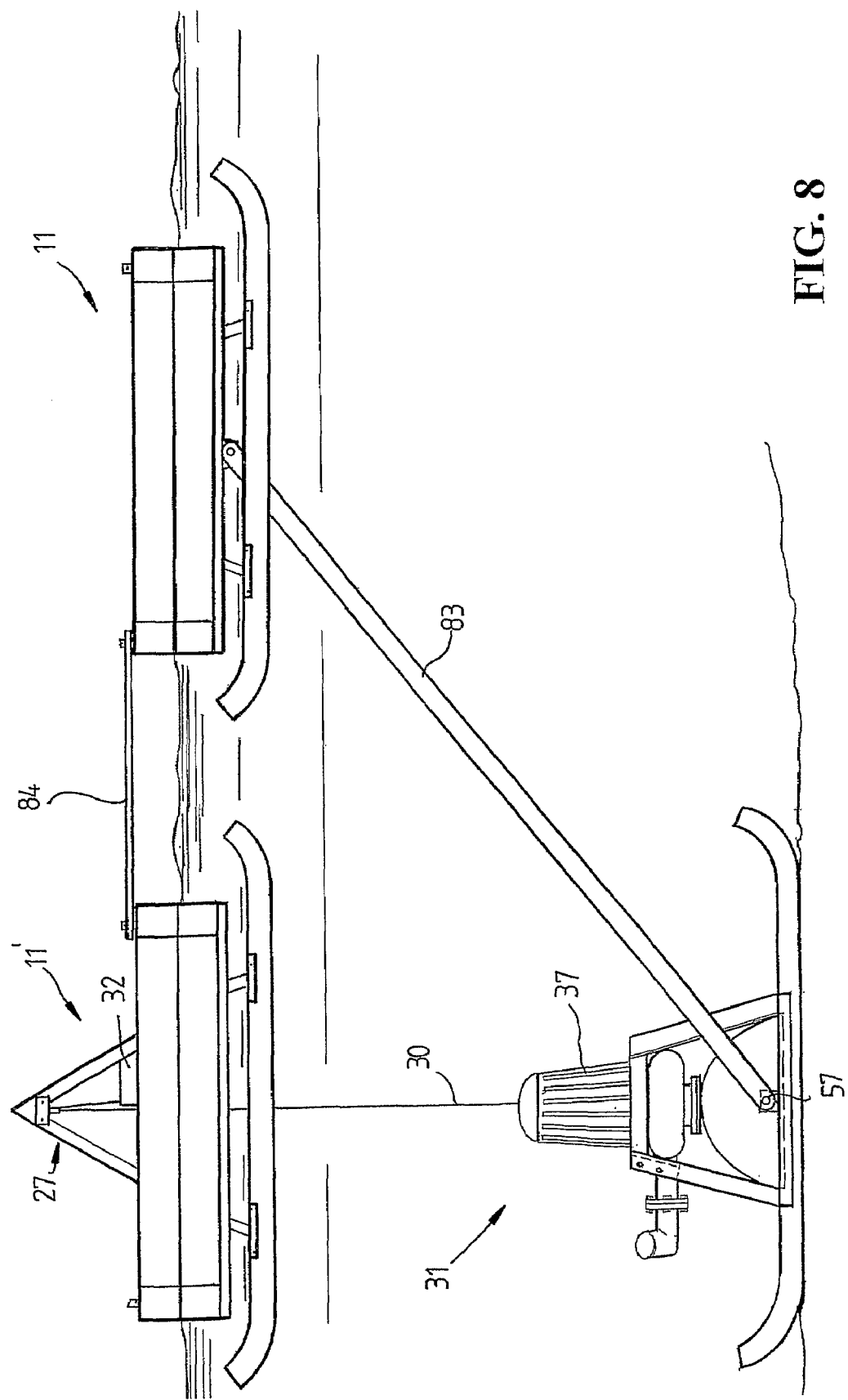
FIG. 8 illustrates a modified configuration of sludge harvester according to another embodiment of the invention.

In another arrangement where the harvester is required to operate at increased depths, the suction head assembly 37 (or pump 31) as shown in FIG. 8 is coupled to one float assembly 11 of the type described above by means of a pair of spaced parallel link arms 83 pivotally connected at one end to opposite sides of the suction head assembly 31 and at their opposite ends to opposite sides of the frame 16 of the float assembly 11. In this arrangement, an additional float assembly 11' is provided, the float assemblies 11 and 11' being linked together by a pair of links 84 on opposite sides of the float assemblies 11 and 11'. For this purpose, the opposite ends of the links 84 are apertured to locate over the upper ends of the posts 20 and are retained by the pins 21. The float assembly 11' is similar to the float assembly 11 of FIG. 1 and includes frames 27 carrying the winch 32 for raising and lowering the suction head assembly 31 (or pump 37) via the cable 30. This arrangement ensures that the suction head assembly 31 will be fixed for movement with the float assemblies 11 and 11' in their movement over the surface of a liquid reservoir in the manner described with reference to FIG. 6. Furthermore when the winch 32 is operated, the link arms 83 guide the movement of the suction head assembly 31 towards and away from the floats 11 and 11'. Of course the floats 11 and 11' may be replaced by a single float to which the suction head assembly 31 is linked by the arms 83.

Figure 9:
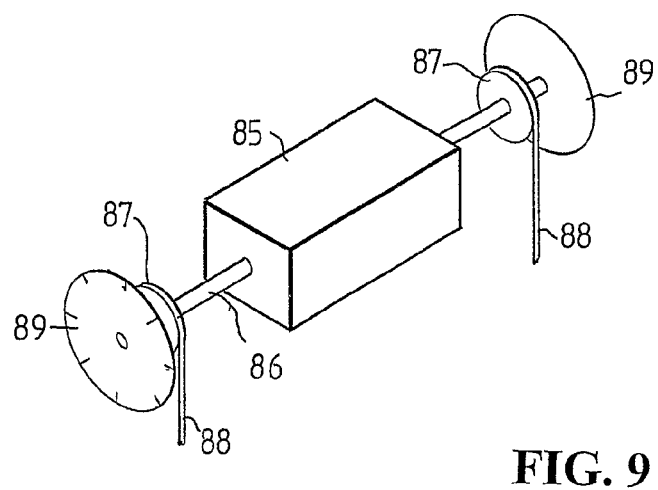
FIG. 9 illustrates an alternative winch system for use with the harvester of FIG. 1.

In an alternative arrangement for providing a visual indication of the depth of operation of the pump 37 and/or suction head assembly 31 and as shown in FIG. 9, the winch 32 may be replaced by a winch 85 having its axis of rotation parallel to the cross arm 28 and driving a shaft 86 having pulleys 87 at each end around which respective cables 88 attached to the pump 37 and/or suction head assembly 31, may pass. Gauge discs 89 fixed for rotation with the pulley or pulleys 87 or shaft 86 may be provided at one or both ends of the shaft, the gauge discs 89 rotating upon rotation of the shaft 86. The discs 89 may carry any markings which may be visually observed to indicate depth.

If desired and as shown in dotted outline in FIG. 1, the harvester 10 may be provided with a removable cover 90 in this embodiment shown in two parts which cover the frames 27, winch 32 and battery 33.

The terms "comprising" or "comprise" or derivatives thereof as used throughout the specification and claims are taken to specify the presence of the stated features, integers and components referred to but not preclude the presence or addition of one or more other feature/s, integer/s, component/s or group thereof.

Whilst the above has been given by way of illustrative embodiment of the invention, all such variations and modifications thereto as would be apparent to persons skilled in the art are deemed to fall within the broad scope and ambit of the invention as defined in the appended claims.

The invention claimed is:

1. Apparatus for removing materials settling in or suspending in liquid in a liquid reservoir, said apparatus comprising
a float assembly,
a suction head assembly substantially vertically beneath said float assembly, said suction head assembly including:
an elongated suction head having a hollow interior and an open lower side defining an entrance mouth, and
a suction pump mounted to said suction head and being adapted to communicate with said hollow interior of suction head, said suction pump being operable to create a suction pressure in said suction head draw in said materials through said mouth and pump said materials to an on-land location,
said suction head assembly further including skids extending forwardly and rearwardly of said suction head,
guide means between said suction head assembly and said float assembly for guiding movement of said suction head assembly towards and away from said float assembly, said guide means including at least one upright elongated member, said at least one elongated member being pivotally connected at its lower end to one end of said suction head assembly,
capturing means on said float assembly which capture said at least one elongated member to said float assembly but which permits said at least one elongated member to be raised and lowered relative to said float assembly,
means for raising and lowering said suction head assembly relative to said float assembly, said raising and lowering means supporting and permitting operation of said suction head between a raised position in which said suction head assembly is located adjacent said float assembly, a lowered position in which said suction head assembly is adjacent to a floor surface of said reservoir and intermediate positions between said raised and lowered positions, said at least one upright elongated member further comprising depth indicating means for visually indicating the depth of operation of said suction head assembly, said apparatus being moveable in use in opposite directions in said reservoir.

2. Apparatus as claimed in claim 1 wherein said float assembly is supported on spaced apart skids whereby the float assembly may be supported for movement on or over a surface and wherein said skids of said suction head assembly are located between said skids of said float assembly in said raised position of said suction head assembly.

3. Apparatus as claimed in claim 2 wherein said skids of said suction head assembly comprise respective skids provided at opposite ends of said suction head.

4. Apparatus as claimed in claim 1 wherein said float assembly comprises one or more annular floats.

5. Apparatus as claimed in claim 4 wherein said float assembly comprises a plurality of annular floats arranged one above the other.

6. Apparatus as claimed in claim 1 wherein said suction head is provided with a central outlet on its upper side for connection to an inlet of said pump, said pump being mounted for movement relative to the suction head between a position where the pump inlet is adjacent to the suction head outlet and communicates therewith and a position where the pump inlet is moved clear of the suction head outlet.

7. Apparatus as claimed in claim 1 wherein said suction head is of domed configuration in cross-section.

8. Apparatus as claimed in claim 1 wherein said capturing means includes slide means whereby said at least one elongated member is captured for sliding movement relative to said float assembly.

9. Apparatus as clamed in claim 1 wherein said guide means comprises a pair of said upright elongated members, said elongated members being pivotally connected at their lower ends to opposite ends of the suction head assembly respectively, each said elongated member being captured to said float assembly for substantially vertical raising and lowering movement relative thereto.

10. Apparatus as claimed in claim 1 wherein said means for raising and lowering said suction head assembly comprises a winch mounted to or on said float assembly, said winch having a winch cable coupled centrally to said suction head assembly.

11. Apparatus as claimed in claim 1 and including means for moving said apparatus in one direction in said liquid reservoir, and means for automatically reversing the direction of movement of said apparatus in said liquid reservoir.

12. Apparatus for removing materials settling in or suspending in liquid in a liquid reservoir, said apparatus comprising:
a float assembly, said float assembly including at least one annular float having a central opening,
a suction head assembly beneath said float assembly, said suction head assembly including:
an elongated suction head having a hollow interior and an open lower side defining an entrance mouth,
a suction pump mounted to said suction head and adapted to communicate with said hollow interior of said suction head, said pump being operable to create a suction pressure in said suction head to draw in said materials through said mouth and pump said materials to a remote location, and
a pair of skids at respective opposite ends of said suction head and extending forwardly and rearwardly thereof, guide means between said suction head assembly and said float assembly for guiding movement of said suction head assembly in a vertical direction, said guide means including a pair of elongated substantially parallel guide members, said guide members being pivotally connected at their lower ends to opposite ends of said suction head assembly, and means for raising and lowering said suction head assembly relative to said float assembly, said raising and lowering means including a cable extending through said central opening in said float assembly and coupled centrally to said suction head assembly intermediate the ends thereof, said raising and lowering means supporting said suction head assembly and permitting operation of said suction head between a raised position in which said suction head assembly located adjacent said float assembly, a lowered position in which said suction head assembly is located adjacent to a floor surface of said reservoir and intermediate positions between said raised and lowered positions.

13. Apparatus as claimed in claim 12 wherein said elongated guide members comprises a pair of spaced apart substantially upright guide members arranged at opposite sides of and being mounted for slidable movement relative to said float assembly in a substantially vertical direction.

14. Apparatus as claimed in claim 13 wherein said float assembly comprises a frame connected to said at least one annular float and spaced apart slide assemblies on said frame and capturing respective said guide members for slidable movement relative to said float assembly.

15. Apparatus as claimed in claim 14 wherein said frame of said float assembly is provided with spaced apart skids and wherein in the raised position of said suction head assembly, said skids of said suction head assembly are located inwardly of the skids of said float assembly.

16. Apparatus for removing materials settling in or suspending in liquid in a liquid reservoir, said apparatus comprising:

a float assembly, said float assembly including a support frame and an annular float member mounted to said support frame, said annular float member having a central opening, a suction head assembly located substantially vertically centrally beneath said float assembly, said suction head assembly including:

an elongated suction head having a hollow interior and an open lower side defining an entrance mouth, said suction head having a domed upper surface, and a central opening in said domed upper surface, a suction pump mounted to said suction head and adapted to communicate with the hollow interior of said suction head through said central opening and an outlet duct extending from said suction pump, said pump being operable to create a suction pressure in said suction head to draw in said materials through said mouth and pump said materials through said outlet duct to a remote location, and skids extending forwardly and rearwardly of said suction head, an electric winch mounted to said support frame means, said winch including a winch cable connected centrally to said suction head assembly, said winch cable being arranged to pass through said central opening in said annular float member, guide means between said suction head assembly and said float assembly for guiding movement of said suction head assembly towards and away from said float assembly, said guide means including a pair of substantially upright elongated guide members, a first said guide member being pivotally connected at its lower end to one end of said suction head assembly and a second said guide member being pivotally connected at its lower end to the other end of said suction head assembly, first and second spaced apart slide assemblies mounted to said support frame, said first and second guide members passing respectively through said first and second slide assemblies whereby to be guided thereby during their movement, said winch being operable to move said suction head assembly between a raised position in which said suction head assembly located adjacent said float assembly for collecting material adjacent the surface of liquid in said reservoir, a lowered position in which said suction head assembly is located adjacent to a floor surface of said reservoir and intermediate positions between said raised and lowered positions and wherein said upright elongated members further comprise depth indicating means for visually indicating the depth of operation of said suction head assembly in said liquid reservoir, and means for moving said apparatus in one direction in said liquid reservoir, and means for automatically reversing the direction of movement of said apparatus in said liquid reservoir.

17. Apparatus as claimed in claim 16 wherein said slide assemblies are mounted on said frame such that said upright guides members extend through said central opening of said annular float member.

18. Apparatus as claimed in claim 16 wherein said skids of said suction head assembly comprise skids provided at opposite ends of said suction head and wherein said float assembly includes skids on opposite sides and extending substantially parallel to said skids of said suction head assembly.

19. Apparatus as claimed in claim 18 wherein skids of said suction head assembly are located between said skids of said float assembly when in said raised position.

20. Apparatus as claimed in claim 16 wherein said float assembly includes a plurality of annular float members arranged one above the other.

\* \* \* \* \*